Patented Dec. 26, 1944

2,366,086

UNITED STATES PATENT OFFICE 2,366,086

CHEWING GUM RESIN BASES

William H. Carmody, Springfield, Ohio, assignor to Carmody Research Laboratories, Inc., a corporation of Ohio No Drawing. Application December 6, 1940, Serial No. 368,891

5 Claims. (Cl. 99—135)

This invention relates to chewing gum bases containing selectively hydrogenated cyclic hydrocarbons.

In the present invention the resins enumerated herein are successively and selectively hydrogenated by recourse to the use of selective catalysts singly or in combination in order to obtain the results desired.

It is to be understood that the present invention disclaims any intention to cover unhydrogenated or completely hydrogenated resins of the classes named herein. This is particularly true of the indene type of resin, and this invention is not drawn to cover it in unhydrogenated form, or in its supposed fully hydrogenated state.

An object of this invention is the use of selectively hydrogenated resins of the classes named, which have been hydrogenated to intermediate degrees of treatment. This intermediate degree is not indiscriminately applied, but is based on the discovery and recognition that the hydrogenation reactions run a course of several distinct and successive paths.

Another object of this invention is the utilization of partly and selectively hydrogenated cyclic hydrocarbon resins of the classes indene resin, coumarone resin, styrene resins, naphthalene resins, cyclopentadiene resins, terpene resin, alpha pinene resin, beta pinene resin, and various derivatives of this list, either by chemical or physical modification, in which the modifying component is of relatively small percentage of the entire resinous polymer.

Another object of this invention is to use hydrogenated materials of definite polymer composition, in the formation of a chewing gum base, whose properties are different and improved over those previously known. By employing minimum selective hydrogenation it is possible to produce a hydrogenated resin from any of the above enumerated cyclic resins of improved properties from the consumer's viewpoint. As example, the unhydrogenated variety of coumarone-indene resin has been used for years as a component of chewing gum bases. The average run of present commercial indene resin is unsuited to such use by the gum manufacturer. This is due to the fact that oxidation centers around the double bond in the terminal unit, and gives rise to aldehydic and acidic flavors in the finished gum if the resin is directly used. This is partly circumvented by various devices employed by both the resin and the gum maker. The resin manufacturer carefully chooses his stock from which the gum resin is to be made, and in addition subjects it to careful washing, and a combined steaming under high vacuum. This represents the peak of commercial resin purification by the original manufacturer. When the resin is received by the gum maker, additional purification steps are applied. As example, water washing on heated rolls or in mixers has been described; also a dilute caustic wash has been applied, and the resin given a further steaming under these conditions for odor and taste improvement. Such steps are directed to removing the undesirable contaminants, but none of the steps applied are directed to act in a preventive manner. The present invention is designed to directly attack the cause of such defect, and by a chemical change, to completely remove the potentiality of spoilage. The present invention is designed to apply such preventive steps in the minimum possible requisite, at the point of need. In addition, to confer certain other desirable properties on the resins, it is illustrated that by progressing further in step-wise manners other improvements may be superimposed on the resins used, and in a manner of order that is required.

A further object of this invention is the use of partly hydrogenated products of cyclic resinous hydrocarbon nature, but whose hydrogenation extent is intermediate between zero and one hundred percent as limits. This is expressed in zones, indicating the selectivity of hydrogenation as applied to the resins employed:

| Cyclic hydrocarbon resin treated, and extent of treatment | Location of hydrogen entry, in zones | Hydrogenated resins claimed for use in chewing gum base, as in the present invention |
|---|---|---|
| Original indene resin | None | None |
| Hydro-indene resin | 1 | Yes |
| Do | 1 and 2 | Yes |
| Do | 1, 2 and 3 | Yes |
| Original coumarone | None | None |
| Hydro-coumarone resin | 1 | Yes |
| Do | 1 and 2 | Yes |
| Do | 1, 2 and 3 | Yes |
| Cyclopentadiene resin | None | None |
| Hydro-cyclopentadiene resin | 1 | Yes |
| Do | 1 and 2 | Yes |
| Styrene resin | None | None |
| Hydro-styrene resin | 1 | Yes |
| Do | 1 and 2 | Yes |
| Do | 1, 2 and 3 | Yes |
| Alpha pinene resin | None | None |
| Hydro-a-pinene resin | 1 and 2 | Yes |
| Do | 1 and 2, and 3 | Yes |
| Beta pinene resin | None | None |
| Hydro-b-pinene resin | 1 and 2 | Yes |
| Do | 1 and 2, and 3 | Yes |

Resins related to the above have been suggested for similar uses. Such resins as used by the prior art are of the type which serve as the initial raw materials of the present invention. Indene resins and terpene resins in fully hydrogenated condition are also recommended for the use of the present invention, as prior to the present invention such completely hydrogenated resins had not been produced and even their theoretical existences had not been postulated, due to limitations placed on the products by the nature of the catalysts employed for such treatments.

The development and application of such catalysts mentioned herein, have been fully described in United States patent application, Serial #280,128, filed by me on June 20, 1939. The system of zones is given in the same application. Definite, selectively hydrogenated intermediates of each of the cyclic resins can be obtained by following the disclosures of this application. Furthermore, the intermediates have been recognized and described in terms of hydrogen content, point of entry of added hydrogen, and are completely defined. Such resins and their properties are further discussed in United States patent application, Serial #363,702, filed October 31, 1940.

In these applications it has been shown that hydrogen enters into well defined positions in each of the cyclic type molecules, with the formation of at least two intermediates in each case. It is shown that indene resin may be saturated exclusively in zone 1 only, to give a definite compound. It can be separately hydrogenated in addition, in zone 2 to give another definite resinous compound whose exact structure has been indicated. In addition, zone 3 can be treated to any desired extent.

In a group of patents issued to William H. Carmody and assigned to the Neville Company, a method is described employing the active Raney nickel catalyst, for saturating coumarone-indene resin of commercial grades. The endpoint obtained by following the disclosures of that group of patents is not identical with that obtained by totally saturating the resin in entirety in zones 1, 2 and 3 as revealed by my aforesaid copending application Serial #280,128. This difference is due to the fact that metallic nickel alone does not hydrogenate the zones to complete extinction of the original structure. As example resin made by the Carmody-Neville patents, when examined showed the following deficiencies: Instead of being totally and completely saturated in all its points, it was saturated in zone 1 to only about 50% and in zones 2 and 3 combined, to an extent of 93–95% of theory. This fact indicates that the double bond about which oxidation centers, was still present and could oxidize and deteriorate in much the original manner, but to a lesser extent.

I have discovered that in the present invention the source of off taste and odor development (the double bond) is removed by selective treatment. The product obtained retains all the original and acceptable properties of ordinary indene-coumarone, but is entirely devoid of the objectionable unsaturation. The balance of the molecule can be retained, if desired, in an untouched condition.

This specific and selective hydrogenation of the ethylenic point of unsaturation, even in the presence of a benzenoid structure, makes available a low cost resin of vastly improved characteristics for the chewing gum industry. Further step-wise treatment of indene resin in zones 2 and 3 gives a resin of differing properties, without being identical with the products of the prior art.

The fundamental thought of selectivity is applicable to all of the cyclic resin structures, either oils or solids, or of coal or terpene derivation. If the unit monomers be synthetic, as for example styrene, these will still respond in the course of the disclosure. The discoveries herein mentioned are specific to the cyclic resin structures, and are not dependent on the sources of the materials.

It has been found that mixtures of the cyclic resinous polymers may be used as the stock to be hydrogenated. It is not feasible to separate indene from coumarone, nor to separate alpha pinene from beta pinene, except at added expense for careful fractionation. Likewise for certain economic reasons it might be desirable to use mixtures of the unsaturated raw materials, and polymerize them to mixtures of resin polymers, of homogeneous or heterogeneous molecular structure.

As illustration of the use of partly hydrogenated resins enumerated above in chewing gum base, use is made of indene-coumarone resin solely hydrogenated in zone 1, and at no other point. This resin is color stable, will not oxidize to yield taste or odor compounds, is nearly colorless. Additional examples may employ other members of the class of cyclic resins, partly hydrogenated, and of terpene or other origin.

Proportions are exemplified by reference to a prior invention, now known as United States Patent #2,087,900. By employing similar proportions, but using the present partly hydrogenated products, the gum base has chewing characteristics of improved merit. The chewing characteristics resemble those of the un-hydrogenated coumarone-indene resin, but in contrast with the original, retain them over a long period of time. Resin completely hydrogenated has improved solubility in petroleum oils and waxes, and this in itself tends to lessen the desirability of using a resin totally saturated in all points. By the use of a partly hydrogenated cyclic resin, the old characteristics of good feature are retained, while the new undesirable features of a completely treated resin are inhibited from appearing.

This inter-relationship of desirable and undesirable properties, resulting from hydrogenation may be further explained. Prior hydrogenation art as applied to indene-coumarone resins gives a nearly saturated product of the cycloparaffin type. This in itself is injurious to a degree since when contacted with the rubber, chicle, or other elastomer of the gum base, the two tend to fuse, merge, or dissolve in each other, and to let down the springiness or chewiness of the product. The present invention discloses how it is possible to avoid the initially present oxidation capacity of the resin, and at the same time to avoid the evils of a totally hydrogenated resin, from the gum maker's view.

In the case of styrene polymers and cyclopentadiene, and naphthalene, and other higher alkylated benzenoid derived resins made from formaldehyde, or derived from combined reduction-polymerization methods, the general desirability of retaining a benzenoid or unsaturated structure is noted.

In the case of terpene polymers, retention of the double ring structure confers desirable properties on an otherwise hydrogenated terpene polymer, made by restricted hydrogenation in zones 1 and 2. Monocyclic terpene polymers, of the poly-dipentene type show the desirable properties when selectively saturated.

Having fully described my invention and its development, I claim the following:

1. A chewing gum base composition consisting essentially of conventional chewing gum ingredients, and a synthetic cyclic hydrocarbon resin having a linear type polymeric molecular structure with a normally present single double bond in the terminal unit thereof and hydrogen combined with the molecule at the said terminal double bond in sufficient amount to saturate such double bond only without substantially altering the balance of the molecule.

2. A chewing gum base composition consisting essentially of conventional chewing gum ingredients, and a synthetic resin composed of indene polymers synthesized from a plurality of monomeric indene units chemically attached in the form of a linear chain and the terminal monomeric unit of which has its single non-nuclear double bond selectively saturated with hydrogen.

3. A chewing gum base composition consisting essentially of conventional chewing gum ingredients, and a synthetic resin composed of coumarone polymers synthesized from a plurality of monomeric coumarone units chemically attached in the form of a linear chain and the terminal coumarone unit of which has its single non-nuclear double bond selectively saturated with hydrogen.

4. A chewing gum base composition consisting essentially of conventional chewing gum ingredients, and a pinene resin composed of pinene polymers each formed of a plurality of monomeric units the terminal pinene unit of which has a single double bond and hydrogen combined with the polymeric molecule at the terminal unit thereof in sufficient amount to saturate such double bond only without substantially altering the balance of the molecule.

5. A new chewing gum base composition consisting essentially of conventional chewing gum ingredients, and a terpene resin composed of terpene polymers each formed of a plurality of monomeric units, the terminal terpene units of which polymers have each a single double bond and hydrogen combined with the molecule at the terminal unit thereof in sufficient amount to saturate such double bond only without substantially altering the balance of the molecule.

W. H. CARMODY.